(12) United States Patent
Hamao et al.

(10) Patent No.: US 12,468,533 B2
(45) Date of Patent: Nov. 11, 2025

(54) INSTRUCTION EXECUTION CONTROL APPARATUS AND METHOD USING CORRESPONDENCE INFORMATION BETWEEN DIFFERENT PROCESSOR INSTRUCTION SETS

(71) Applicant: RENESAS ELECTRONICS CORPORATION, Tokyo (JP)

(72) Inventors: Hitoshi Hamao, Tokyo (JP); Koichi Sato, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 108 days.

(21) Appl. No.: 18/479,320

(22) Filed: Oct. 2, 2023

(65) Prior Publication Data

US 2024/0160450 A1  May 16, 2024

(30) Foreign Application Priority Data

Nov. 15, 2022  (JP) ................................. 2022-182578

(51) Int. Cl.
  *G06F 9/30*   (2018.01)
  *G06F 9/38*   (2018.01)

(52) U.S. Cl.
  CPC .......... *G06F 9/3017* (2013.01); *G06F 9/3861* (2013.01); *G06F 9/3877* (2013.01)

(58) Field of Classification Search
  CPC ... G06F 9/30174; G06F 9/3861; G06F 9/3877
  See application file for complete search history.

(56) References Cited

U.S. PATENT DOCUMENTS

| | | | | |
|---|---|---|---|---|
| 2010/0299130 | A1* | 11/2010 | Mitsuzawa | G06F 9/45558 712/225 |
| 2012/0317568 | A1* | 12/2012 | Aasheim | G06F 9/5094 718/1 |
| 2019/0129489 | A1* | 5/2019 | Mednick | G06F 1/3287 |
| 2021/0357549 | A1 | 11/2021 | Yoshinaga et al. | |
| 2021/0373859 | A1* | 12/2021 | Kawakami | G06F 9/30174 |

OTHER PUBLICATIONS

Dheeraj Reddy, David Koufaty, Paul Brett, Scott Hahn, "Bridging Functional Heterogeneity in Multicore Architectures", ACM, pp. 21-33 (Year: 2011).*

* cited by examiner

*Primary Examiner* — Courtney P Spann
(74) *Attorney, Agent, or Firm* — Rimon P.C.

(57) ABSTRACT

An instruction execution control apparatus is configured to acquire correspondence information. The correspondence information associates a non-common instruction with a common instruction. The non-common instruction is an instruction not executable by a first processor but executable by a second processor. The common instruction is an instruction executable by both the first processor and the second processor. The instruction execution control apparatus is configured to use the correspondence information to specify the common instruction corresponding to the non-common instruction in response to the detection of the non-common instruction in the first processor. The instruction execution control apparatus causes the first processor to execute the specified common instruction.

9 Claims, 12 Drawing Sheets

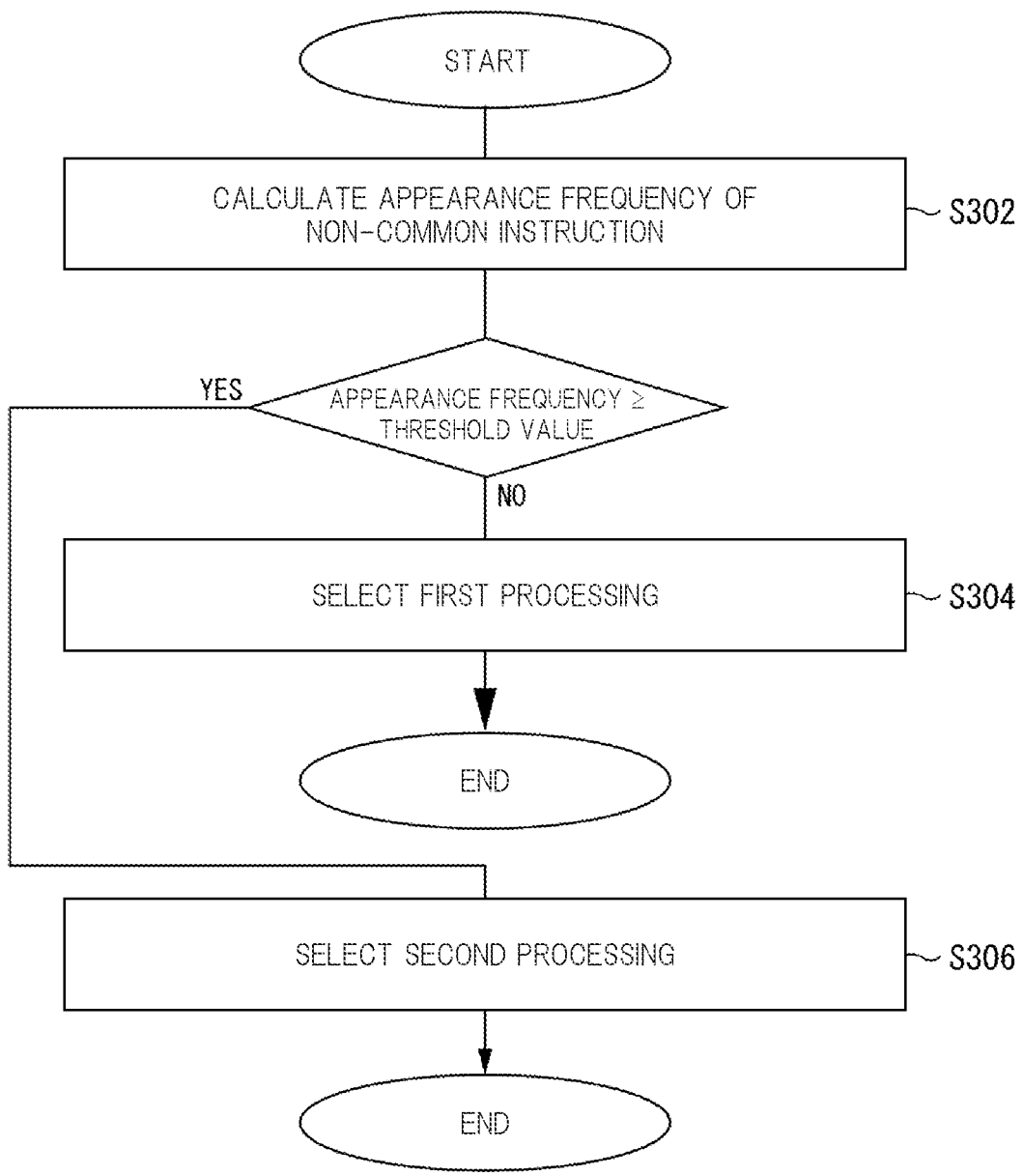

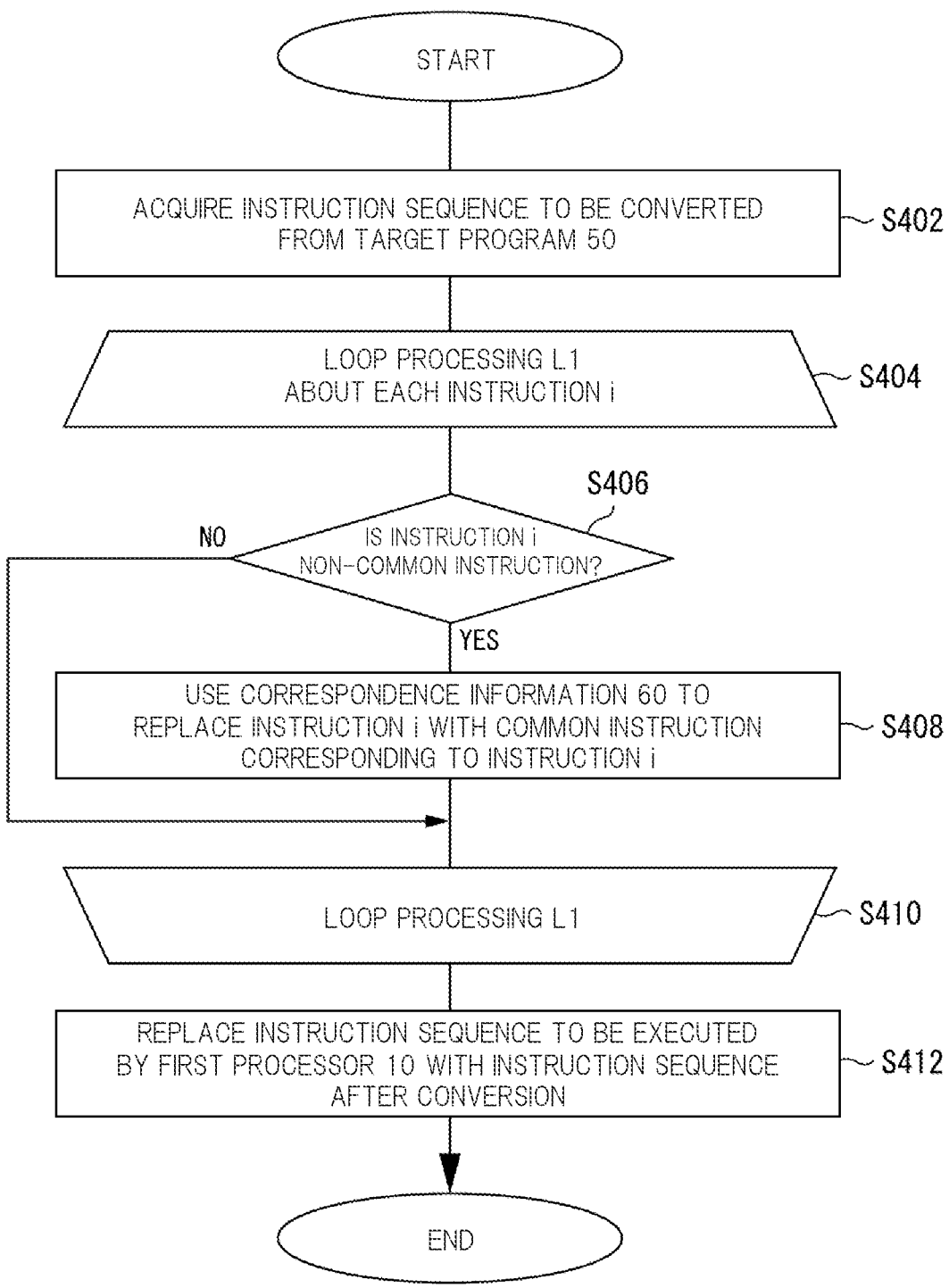

INSTRUCTION EXECUTION CONTROL APPARATUS AND METHOD USING CORRESPONDENCE INFORMATION BETWEEN DIFFERENT PROCESSOR INSTRUCTION SETS

CROSS-REFERENCE TO RELATED APPLICATIONS

The disclosure of Japanese Patent Application No. 2022-182578 filed on Nov. 15, 2022 including the specification, drawings and abstract is incorporated herein by reference in its entirety.

BACKGROUND

The present disclosure relates to a technique for controlling execution of an instruction by a processor.

There is a disclosed technique listed below.
[Patent Document 1] US Patent Application Publication No. 2021/0357549

There has been developed a technique for causing a processor corresponding to an instruction set different from a certain instruction set to execute a program described with instructions included in the certain instruction set. Here, the instruction set is a set of instructions executable by a specific type of a processor. For example, Patent Document 1 discloses a processor simulator having two modes of a high accuracy mode and a high speed mode.

SUMMARY

Patent Document 1 does not mention a specific method of replacing each instruction included in a program to be simulated with an instruction executable by a host processor.

Other problems and novel characteristics will become apparent from the description of the present specification and the accompanying drawings.

A program according to an embodiment acquires correspondence information that associates a non-common instruction that is an instruction not executable by a first processor but executable by a second processor with a common instruction that is an instruction executable by both the first processor and the second processor. Then, in response to the detection of the non-common instruction in the first processor, the program causes the first processor to execute the common instruction corresponding to the non-common instruction.

According to the present disclosure, there is provided a new technique for causing a processor corresponding to an instruction set different from a certain instruction set to execute a program described with instructions included in the certain instruction set.

BRIEF DESCRIPTION OF THE DRAWINGS

FIG. 11 is a flowchart illustrating a flow of processing of selecting one of first processing and second processing.

FIG. 12 is a flowchart illustrating a flow of processing executed by a conversion unit.

DETAILED DESCRIPTION

Figure 1:
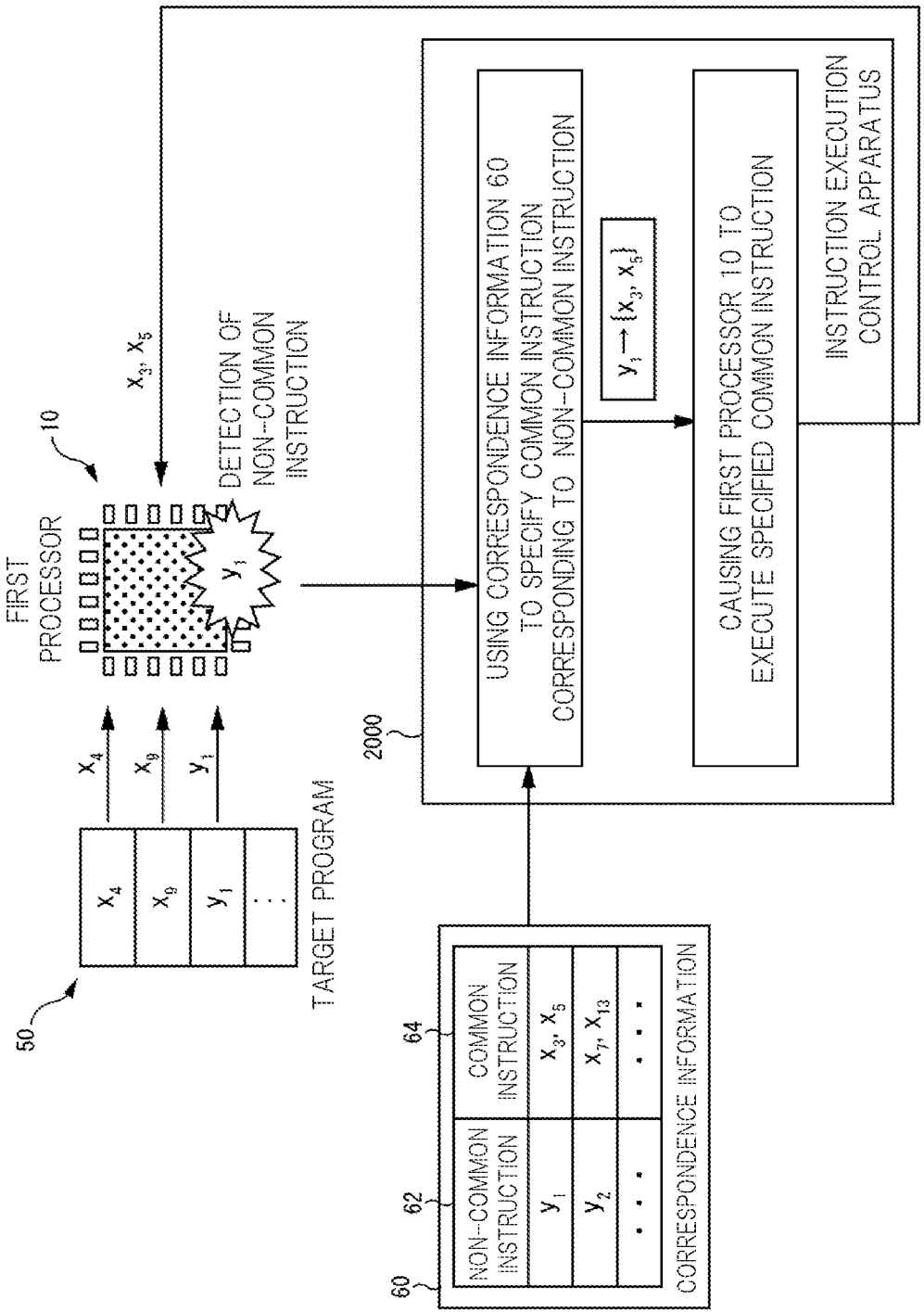
FIG. 1 is a diagram illustrating an outline of an instruction execution control apparatus according to a first embodiment.

Hereinafter, embodiments of the present disclosure will be described in detail with reference to the drawings. In the drawings, the same or corresponding elements are denoted by the same reference signs, and redundant description is omitted as necessary for clarity of description. In addition, unless otherwise described, prescribed values such as predetermined values and threshold values are stored in advance in a storage device or the like accessible from a device using the values. Furthermore, unless otherwise described, a storage unit includes any number of one or more storage devices.

First Embodiment

<Outline>

Figure 2:
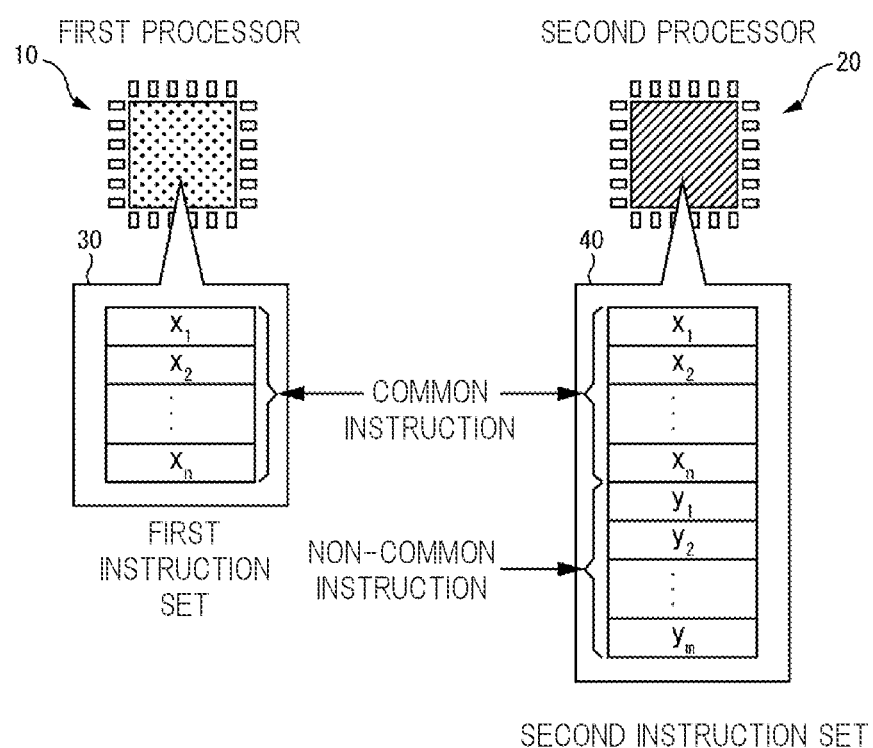
FIG. 2 is a diagram illustrating a relationship between a first processor and a second processor.

Hereinafter, an outline of an instruction execution control apparatus 2000 according to a first embodiment will be described with reference to FIGS. 1 and 2. FIG. 1 is a diagram illustrating an outline of the instruction execution control apparatus 2000 according to the first embodiment. FIG. 2 is a diagram illustrating a relationship between a first processor 10 and a second processor 20 to be described later. Here, FIG. 1 is a diagram for facilitating understanding of the outline of the instruction execution control apparatus 2000, and the operation of the instruction execution control apparatus 2000 is not limited to that illustrated in FIG. 1.

The instruction execution control apparatus 2000 controls execution of a target program 50 by the first processor 10. The target program 50 includes instructions included in a second instruction set 40. The second instruction set 40 is a set of instructions executable by the second processor 20 different from the first processor 10. Note that a set of instructions executable by the first processor 10 is referred to as a first instruction set 30.

The second instruction set 40 includes both a common instruction that is an instruction also included in the first instruction set 30 and a non-common instruction that is an instruction not included in the first instruction set 30. The non-common instruction is an instruction executable in the second processor 20 but not executable in the first processor 10. Meanwhile, the common instruction is an instruction executable in both the first processor 10 and the second processor 20.

In FIG. 2, the first instruction set 30 includes only the common instruction, while the second instruction set 40 includes both the common instruction and the non-common instruction. The second processor 20 including such an instruction set is, for example, a processor newly developed on the basis of the first processor 10. Note that the first instruction set 30 may include an instruction executable in the first processor 10 but not executable in the second processor 20.

Since the target program 50 includes the instructions included in the second instruction set 40, the target program 50 may include a non-common instruction not executable by the first processor 10. Therefore, it is not possible to cause the first processor 10 to execute the entire target program 50 as it is.

The instruction execution control apparatus 2000 uses the first processor 10 to enable the target program 50 to be executed even in a case where the non-common instruction is included in the target program 50. Hereinafter, after the premises of the present disclosure will be described further, an outline of the operation of the instruction execution control apparatus 2000 will be described.

The common instruction is an instruction having an assigned identifier (instruction code). The common instruction in the first instruction set 30 and the common instruction in the second instruction set 40 have the same assigned identifier. In addition, an effect obtained by executing a certain common instruction by the first processor 10 and an effect obtained by executing the common instruction by the second processor 20 are equivalent to each other.

For example, it is assumed that both the first instruction set 30 and the second instruction set 40 each include a common instruction x1 whose identifier is x1. In this case, the common instruction x1 is a common instruction executable by both the first processor 10 and the second processor 20. Then, an effect obtained by causing the first processor 10 to execute the common instruction x1 and an effect obtained by causing the second processor 20 to execute the common instruction x1 are equivalent to each other.

Meanwhile, an instruction having the same identifier as an identifier of the non-common instruction is not included in the first instruction set 30. For example, it is assumed that the second instruction set 40 includes a non-common instruction y1. In this case, an instruction whose identifier is y1 is not included in the first instruction set 30. Therefore, the instruction whose identifier is y1 is executable by the second processor 20 but not executable by the first processor 10.

For example, in FIG. 2, both the first instruction set 30 and the second instruction set 40 each include n common instructions whose identifiers are x1 to xn. Furthermore, the second instruction set 40 includes m non-common instructions whose identifiers are y1 to ym.

The non-common instruction can be replaced with an instruction sequence including one or more common instructions. Here, "a certain instruction a can be replaced with an instruction sequence {b1, . . . , bn}" means that an effect equivalent to an effect obtained by executing the instruction a is obtained by executing instructions b1, . . . , bn in this order.

A correspondence relationship between the non-common instruction and the common instruction is indicated by correspondence information 60 illustrated in FIG. 1. The correspondence information 60 is information that associates a non-common instruction with an instruction sequence of a common instruction corresponding to the non-common instruction. Here, "an instruction sequence of a common instruction corresponding to the non-common instruction" is an instruction sequence of a common instruction that can be replaced with the non-common instruction.

Each row in the correspondence information 60 indicates one non-common instruction in a non-common instruction 62 and indicates an instruction sequence of a common instruction that can be replaced with the non-common instruction in a common instruction 64. For example, in FIG. 1, the first row in the correspondence information 60 indicates that the non-common instruction y1 can be replaced with an instruction sequence {x3, x5} of the common instruction. Therefore, an effect equivalent to an effect obtained by causing the second processor 20 to execute the non-common instruction y1 can also be obtained by causing the first processor 10 to execute common instructions x3 and x5 in this order.

Note that the correspondence information 60 also includes information regarding an operand handled in each instruction as necessary. For example, as described above, it is assumed that the non-common instruction y1 can be replaced with the instruction sequence {x3, x5} of the common instruction. In a case where the non-common instruction y1 takes one or more operands, the correspondence information 60 indicates a correspondence relationship between the operands of the non-common instruction y1 and the operands of the common instructions x3 and x5. In addition, the common instruction x3 is executed before the common instruction x5, whereby the common instruction x5 can use data stored in a register or a memory. Therefore, the common instruction 64 also indicates execution results and operand relationships of a plurality of common instructions included in one instruction sequence.

Under the above premises, the instruction execution control apparatus 2000 controls the execution of the target program 50 by the first processor 10. As described above, since the target program 50 includes the instructions included in the second instruction set 40, the target program 50 may include the non-common instruction. Therefore, in response to the detection of the non-common instruction in the first processor 10, the instruction execution control apparatus 2000 uses the correspondence information 60 to specify the common instruction corresponding to the non-common instruction. Then, the instruction execution control apparatus 2000 causes the first processor 10 to execute the specified common instruction. In this way, an effect equivalent to an effect obtained by executing the non-common instruction can be obtained by executing the common instruction corresponding to the non-common instruction.

Note that the common instruction can be executed even by the second processor 20. Therefore, the second processor 20 can execute the common instruction not through control by the instruction execution control apparatus 2000.

Example of Operation and Effects

As a method for using a specific processor to execute a program including an instruction not executable by the processor, there is a method using binary translation. In the binary translation, before an instruction sequence included in a target program is executed by a processor, the instruction sequence is replaced with an instruction sequence executable by the processor. With this method, it is necessary to determine whether replacement is needed for each of all instructions included in the instruction sequence. Therefore, overhead due to the determination as to whether replacement is needed may increase.

In contrast, the instruction execution control apparatus 2000 of the present embodiment causes the first processor 10 to execute the common instruction corresponding to the non-common instruction in response to the detection of the non-common instruction in the first processor 10. With this method, it is unnecessary to determine whether replacement of an instruction is needed for each common instruction included in the target program 50. Therefore, overhead generated when the target program 50 is executed by the first processor 10 can be reduced.

Hereinafter, the instruction execution control apparatus 2000 of the present embodiment will be described in more detail.

Example of Functional Configuration

Figure 3:
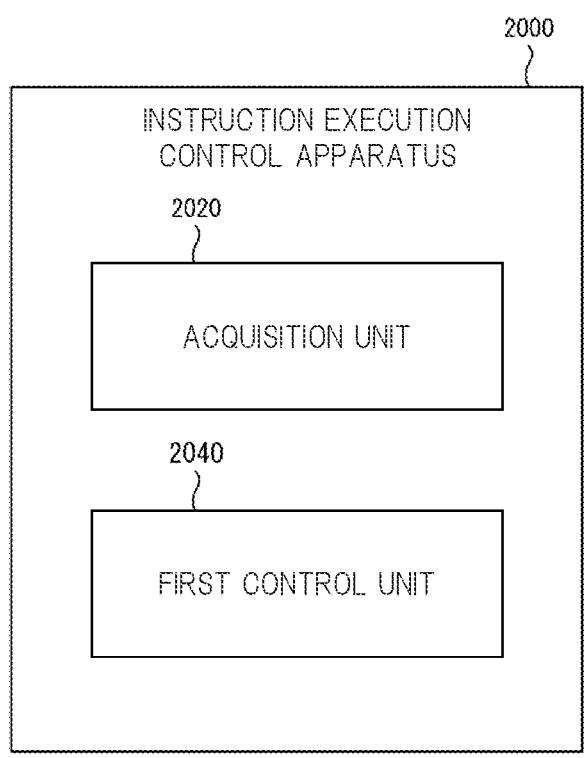
FIG. 3 is a block diagram illustrating a functional configuration of the instruction execution control apparatus according to the first embodiment.

FIG. 3 is a block diagram illustrating a functional configuration of the instruction execution control apparatus 2000 according to the first embodiment. The instruction execution control apparatus 2000 includes an acquisition unit 2020 and a first control unit 2040. The acquisition unit 2020 acquires the correspondence information 60. The first control unit 2040 uses the correspondence information 60 to specify the common instruction corresponding to the non-common instruction detected in the first processor 10. The first control unit 2040 causes the first processor 10 to execute the specified common instruction.

Example of Hardware Configuration

Each functional component of the instruction execution control apparatus 2000 may be achieved by hardware (for example, a hard-wired electronic circuit or the like) that achieves each functional component, or may be achieved by a combination of hardware and software (for example, a combination of an electronic circuit and a program that controls the electronic circuit or the like). Hereinafter, a case where each functional component of the instruction execution control apparatus 2000 is achieved by a combination of hardware and software will be further described.

Figure 4:
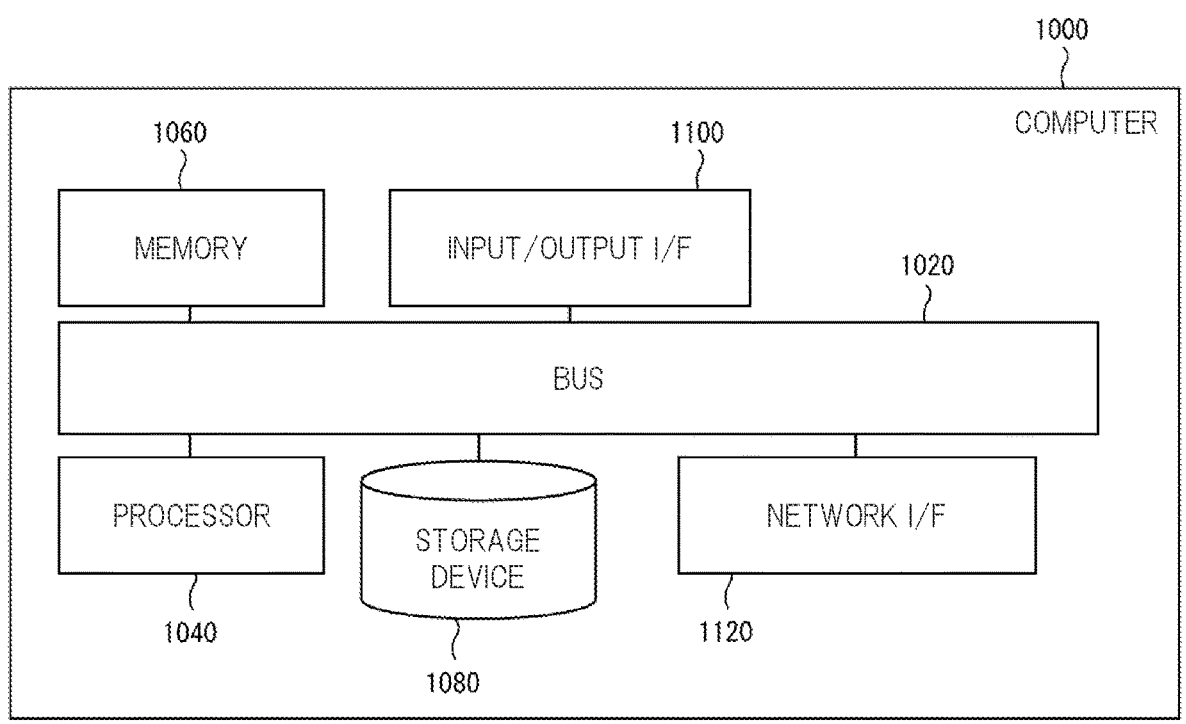
FIG. 4 is a block diagram illustrating a hardware configuration of a computer that achieves the instruction execution control apparatus.

FIG. 4 is a block diagram illustrating a hardware configuration of a computer 1000 that achieves the instruction execution control apparatus 2000. The computer 1000 is any computer. For example, the computer 1000 is a stationary computer such as a personal computer (PC) or a server machine. In addition, for example, the computer 1000 is a portable computer such as a smartphone or a tablet terminal. In addition, for example, the computer 1000 is an integrated circuit such as a system on chip (SoC). The computer 1000 may be a dedicated computer designed for achieving the instruction execution control apparatus 2000 or may be a general-purpose computer.

For example, each function of the instruction execution control apparatus 2000 is achieved in the computer 1000 by installing a predetermined application in the computer 1000. The above application includes a program for achieving each functional component of the instruction execution control apparatus 2000. Note that a method of acquiring the program is any method. For example, the program can be acquired from a storage medium (a digital versatile disc (DVD), a USB memory, or the like) in which the program is stored. In addition, for example, the program can be acquired by downloading the program from a server device that manages a storage device in which the program is stored.

The computer 1000 includes a bus 1020, a processor 1040, a memory 1060, a storage device 1080, an input/output interface 1100, and a network interface 1120. The bus 1020 is a data transmission path for the processor 1040, the memory 1060, the storage device 1080, the input/output interface 1100, and the network interface 1120 to transmit and receive data to and from each other. However, a method of connecting the processor 1040 and the like to each other is not limited to a bus connection.

The processor 1040 is various processors such as a central processing unit (CPU), a graphics processing unit (GPU), a field-programmable gate array (FPGA), and a digital signal processor (DSP). Here, the processor 1040 is the first processor 10 described above. Note that in a case where the computer 1000 includes a plurality of processors 1040, all of the processors 1040 may be the first processors 10, or some (for example, one) of the processors 1040 may be the first processors 10.

The memory 1060 is a main storage device achieved by using a random access memory (RAM) or the like. The storage device 1080 is an auxiliary storage device achieved by using a hard disk, a solid state drive (SSD), a memory card, a RAM, a flash memory, a read only memory (ROM), or the like.

The input/output interface 1100 is an interface for connecting the computer 1000 and an input/output device. For example, an input device such as a keyboard and an output device such as a display device are connected to the input/output interface 1100.

The network interface 1120 is an interface for connecting the computer 1000 to a network. The network may be a local area network (LAN) or a wide area network (WAN).

The storage device 1080 stores the program that achieves each functional component of the instruction execution control apparatus 2000 (program for achieving the application described above). The processor 1040 achieves each functional component of the instruction execution control apparatus 2000 by reading out the program to the memory 1060 and executing the program.

The instruction execution control apparatus 2000 may be achieved by one computer 1000 or may be achieved by a plurality of computers 1000. In the latter case, the configurations of the computers 1000 do not need to be the same and can be different from each other.

<Flow of Processing>

Figure 5:
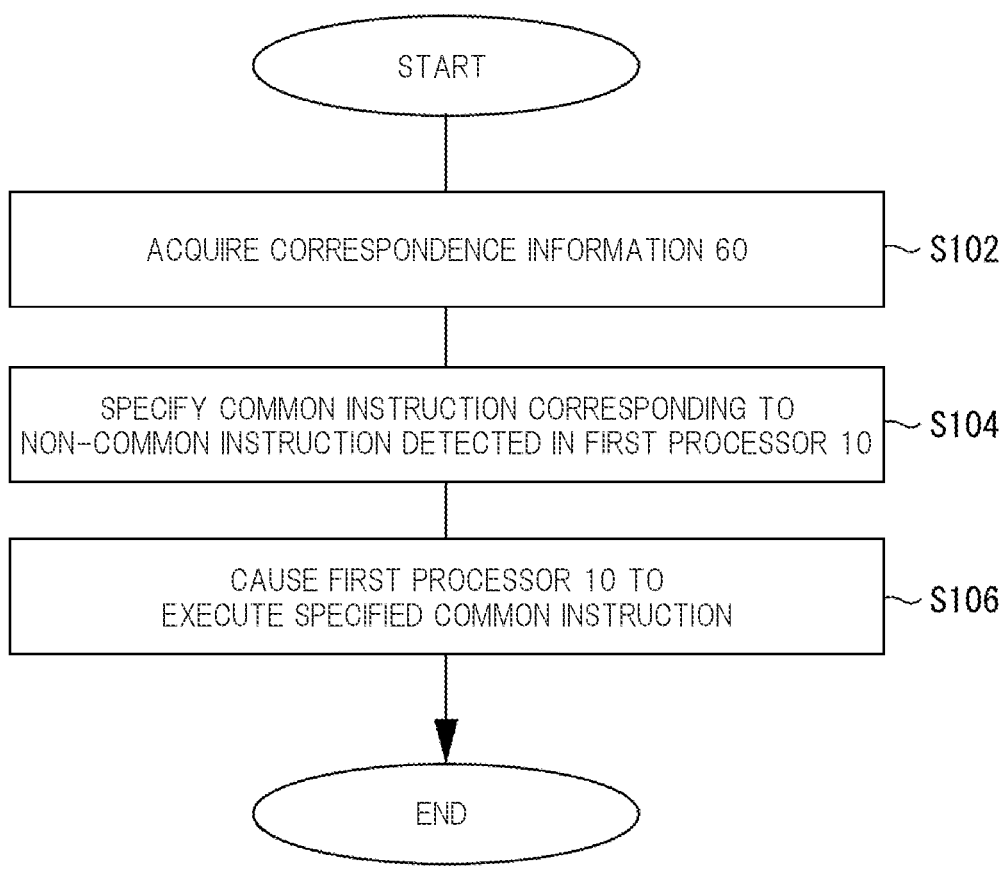
FIG. 5 is a flowchart illustrating a flow of processing executed by the instruction execution control apparatus according to the first embodiment.

FIG. 5 is a flowchart illustrating a flow of processing executed by the instruction execution control apparatus 2000 of the first embodiment. The acquisition unit 2020 acquires the correspondence information 60 (S102). The first control unit 2040 uses the correspondence information 60 to specify the common instruction corresponding to the non-common instruction detected in the first processor 10 (S104). The first control unit 2040 causes the first processor 10 to execute the specified common instruction (S106).

The flow of processing executed by the instruction execution control apparatus 2000 is not limited to the flow illustrated in FIG. 5. For example, as will be described later, the entire content of the correspondence information 60 may be acquired, for example, when the instruction execution control apparatus 2000 starts. In this case, the instruction execution control apparatus 2000 does not need to acquire the correspondence information 60 every time the non-common instruction is detected in the first processor 10.

<Acquisition of Correspondence Information 60: S102>

The first control unit 2040 acquires the correspondence information 60 (S102). Here, the correspondence information 60 may be acquired in advance before the non-common instruction is detected in the first processor 10, or may be acquired in response to the detection of the non-common instruction in the first processor 10. In the former case, for example, the instruction execution control apparatus 2000 acquires the correspondence information 60, for example, when the instruction execution control apparatus 2000 starts or when the execution of the target program 50 starts. In this case, it is preferable to acquire the entire content of the correspondence information 60.

Meanwhile, in a case where the correspondence information 60 is acquired in response to the detection of the non-common instruction in the first processor 10, for example, the instruction execution control apparatus 2000 acquires only information indicating the common instruction corresponding to the detected non-common instruction among information included in the correspondence information 60. In addition, for example, the instruction execution control apparatus 2000 may acquire the entire content of the correspondence information 60 when the first processor 10 detects the non-common instruction first after the instruction execution control apparatus 2000 starts.

A method by which the instruction execution control apparatus 2000 acquires the correspondence information 60 is any method. For example, the correspondence information 60 is stored in advance in the storage unit accessible from the instruction execution control apparatus 2000. In this case, the instruction execution control apparatus 2000 acquires the correspondence information 60 by reading out the correspondence information 60 from the storage unit. In addition, for example, the instruction execution control apparatus 2000 may acquire the correspondence information 60 by receiving the correspondence information 60 transmitted from another device. Another device is, for example, any terminal operated by a user of the instruction execution control apparatus 2000.

<Identification of Common Instruction Corresponding to Non-common Instruction: S104>

The first control unit 2040 uses the correspondence information 60 to specify the common instruction corresponding to the non-common instruction detected in the first processor 10 (S104). For example, the first control unit 2040 specifies, from the correspondence information 60, a record in which the identification information of the non-common instruction detected in the first processor 10 is indicated in the non-common instruction 62. Then, the first control unit 2040 specifies the common instruction indicated in the common instruction 64 in the specified record as the common instruction corresponding to the non-common instruction detected in the first processor 10.

As a premise of the processing described above, the first control unit 2040 grasps that the non-common instruction has been detected in the first processor 10. Here, since the non-common instruction is an instruction not executable by the first processor 10, when the first processor 10 tries to execute the non-common instruction, the non-common instruction is detected as an invalid instruction. As a more specific example, when an instruction decoder of the first processor 10 tries to decode the non-common instruction, there occurs an exception indicating that an invalid instruction has been tried to be executed (indicating that there is no applicable instruction). Note that the exception can also be expressed as "interruption".

Therefore, for example, the first control unit 2040 is achieved as part of an exception handler corresponding to an exception that occurs in a case where an invalid instruction has been tried to be executed in the first processor 10. In other words, processing performed by the first control unit 2040 is achieved as the processing of the exception handler. As a result, the first control unit 2040 can operate in response to the detection of the non-common instruction in the first processor 10. Hereinafter, an exception that occurs in a case where an invalid instruction has been tried to be executed in the first processor 10 is referred to as "invalid instruction exception", and an exception handler corresponding to the invalid instruction exception is referred to as "invalid instruction handler".

The first control unit 2040 determines whether an instruction that has caused the invalid instruction exception (hereinafter, the target instruction) is a non-common instruction. Therefore, the invalid instruction handler acquires identification information of the instruction that has caused the invalid instruction exception (that is, identification information of the target instruction). Furthermore, the first control unit 2040 determines whether there is a non-common instruction having identification information matching the identification information of the target instruction. The identification information of each non-common instruction can be acquired from, for example, the correspondence information 60. However, information indicating identification information of each non-common instruction may be prepared separately from the correspondence information 60.

In a case where there is a non-common instruction having identification information matching the identification information of the target instruction, the target instruction is a non-common instruction. Therefore, the first control unit 2040 specifies the common instruction corresponding to the target instruction (that is, the non-common instruction).

Meanwhile, in a case where there is no non-common instruction having identification information matching the identification information of the target instruction, the target instruction is an invalid instruction other than the non-common instruction. As described above, in a case where the target instruction is an invalid instruction other than the non-common instruction, processing executed by the first control unit 2040 is any processing. For example, the first control unit 2040 performs processing of forcibly terminating the target program 50. At this time, an error notification indicating that the invalid instruction has been executed may be output by any method.

<Execution of Common Instruction Corresponding to Non-Common Instruction: S106>

The first control unit 2040 causes the first processor 10 to execute the common instruction corresponding to the target instruction (S104). Note that various existing methods can be used as a method of causing the processor to execute a specific instruction.

Here, in an execution context of the target program 50 being interrupted due to the occurrence of the invalid instruction exception, the current instruction is the target instruction detected as the non-common instruction. Therefore, before the execution of the target program 50 is resumed, the first control unit 2040 performs processing of changing an instruction to be executed first in the resumed target program 50 from the currently set target instruction to an instruction next to the currently set target instruction (hereinafter, the next instruction). By doing this, the first control unit 2040 causes the first processor 10 to execute the common instruction corresponding to the non-common instruction and then prevents the first processor 10 from executing the non-common instruction itself. Therefore, instead of the non-common instruction not executable in the first processor 10, the common instruction corresponding to the non-common instruction is executed in the first processor 10.

Here, various methods can be adopted as a method of changing the instruction to be executed first in the resumed target program 50. For example, the first control unit 2040 changes the content of the execution context of the target program 50. Here, when the invalid instruction handler is called, the execution context of the target program 50 is saved in a memory. A value of a program counter included in this execution context refers to the non-common instruction that caused the invalid instruction exception. Therefore, the first control unit 2040 changes the value of the program counter included in the execution context of the target program 50 saved in the memory to a value indicating the next instruction. As a result, the instruction to be executed first in the resumed target program 50 can be changed.

Note that as described above, the first control unit 2040 is achieved as part of the invalid instruction handler. Then, the execution of the target program 50 is resumed after the execution of the invalid instruction handler ends. Therefore, before the execution of the target program 50 is resumed, the first control unit 2040 can change the instruction to be executed first in the resumed target program 50.

Examples of Implementation Modes of Instruction Execution Control Apparatus 2000

To facilitate understanding of the instruction execution control apparatus 2000, some examples of more specific implementation modes of the instruction execution control apparatus 2000 will be illustrated. The following implementation modes are merely examples for facilitating understanding of the instruction execution control apparatus 2000, and the implementation modes of the instruction execution control apparatus 2000 are not limited to the following examples.

Figure 6:
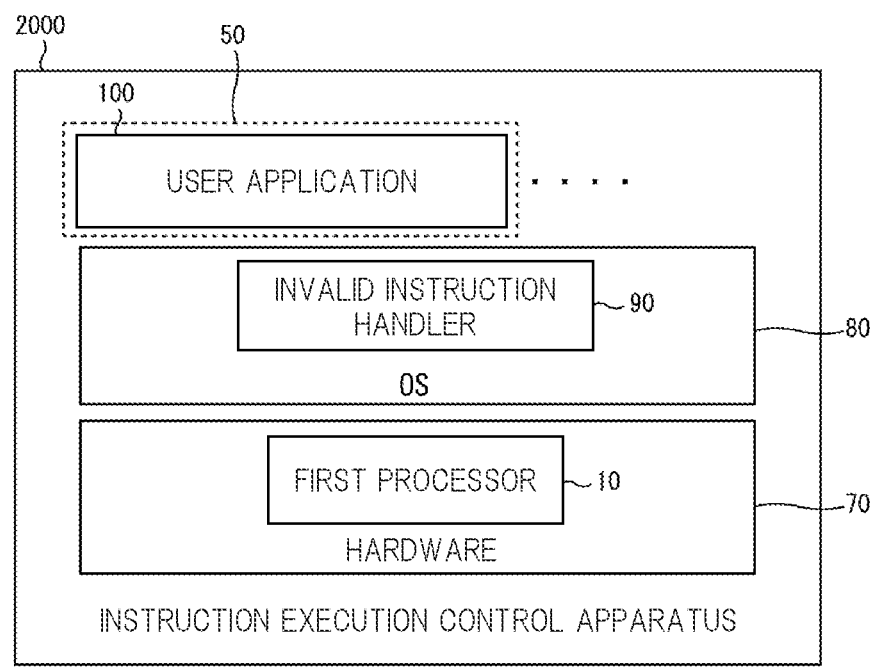
FIG. 6 is a first diagram illustrating a specific implementation mode of the instruction execution control apparatus.

FIG. 6 is a first diagram illustrating a specific implementation mode of the instruction execution control apparatus 2000. In the instruction execution control apparatus 2000 of FIG. 6, an operating system (OS) 80 operates on hardware 70 including a first processor 10. The hardware 70 corresponds to the hardware constituting the computer 1000 illustrated in FIG. 4.

The OS 80 includes an invalid instruction handler 90. A first control unit 2040 is achieved as part of the invalid instruction handler 90. An acquisition unit 2020 may be achieved as part of the invalid instruction handler 90 or may be achieved as another part of the OS 80. In the latter case, for example, the acquisition unit 2020 is achieved as part of processing executed when the OS 80 starts.

A user application 100 operates on the OS 80. In an example of FIG. 6, the user application 100 corresponds to a target program 50. Note that in a case where a plurality of user applications 100 operates, each user application 100 is handled as the target program 50. However, the instruction execution control apparatus 2000 may receive a selection as to whether to handle the user application 100 as the target program 50 (in other words, whether the target program 50 is to be controlled by the instruction execution control apparatus 2000), for example, when the user application 100 starts.

When the execution of the target program 50 is started, the first processor 10 executes each instruction constituting the target program 50. Here, since an invalid instruction exception occurs when a non-common instruction is executed, the execution context of the target program 50 is saved in a memory, and then the invalid instruction handler 90 is called.

The invalid instruction handler 90 specifies a common instruction corresponding to the non-common instruction and causes the first processor 10 to execute the specified common instruction. When the execution of the invalid instruction handler 90 ends, the execution of the target program 50 is resumed.

Figure 7:
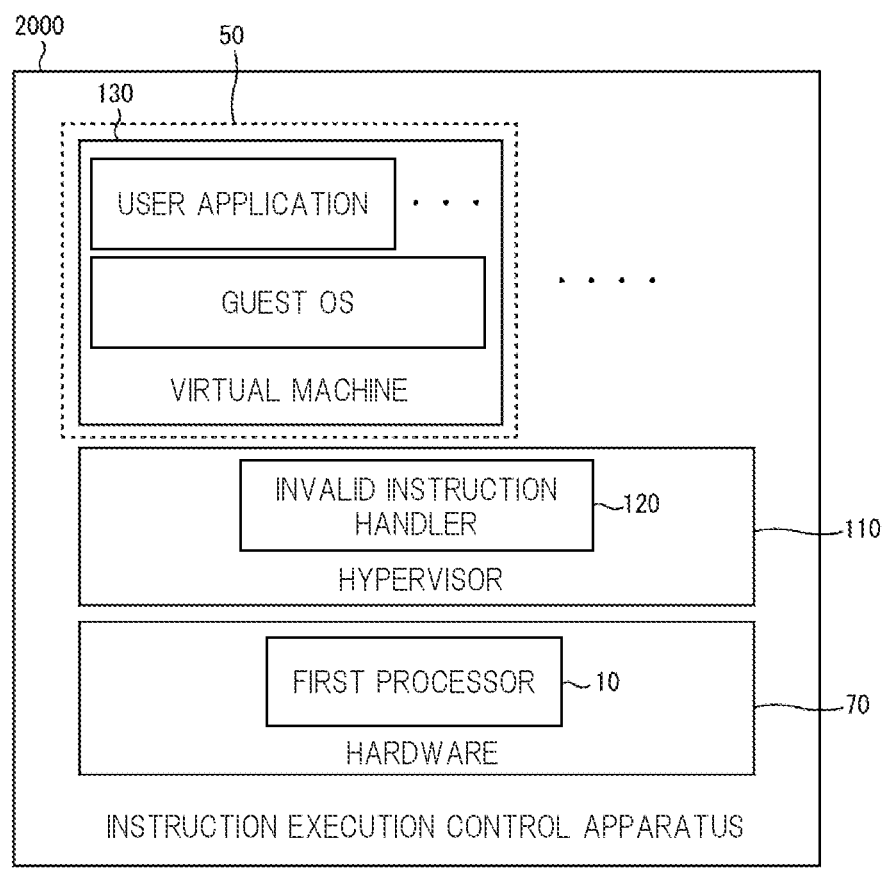
FIG. 7 is a second diagram illustrating a specific implementation mode of the instruction execution control apparatus.

FIG. 7 is a second diagram illustrating a specific implementation mode of the instruction execution control apparatus 2000. In the instruction execution control apparatus 2000 of FIG. 7, a hypervisor 110 operates on a hardware 70 including a first processor 10. The hypervisor 110 includes an invalid instruction handler 120. A first control unit 2040 is achieved as part of the invalid instruction handler 120. An acquisition unit 2020 may be achieved as part of the invalid instruction handler 120 or may be achieved as another part of the hypervisor 110.

A virtual machine 130 operates on the hypervisor 110. In an example of FIG. 7, the virtual machine 130 corresponds to a target program 50. Therefore, a guest OS that operates on the virtual machine 130 and a user application that operates on the guest OS are collectively handled as one target program 50. In a case where a plurality of virtual machines 130 operates, each virtual machine 130 can be handled as the target program 50.

When the execution of the target program 50 is started, the first processor 10 executes each instruction constituting the target program 50. Here, since an invalid instruction exception occurs when a non-common instruction is executed, the execution context of the target program 50 is saved in a memory, and then the invalid instruction handler 120 is called.

The invalid instruction handler 120 specifies a common instruction corresponding to the non-common instruction and causes the first processor 10 to execute the specified common instruction. When the execution of the invalid instruction handler 120 ends, the execution of the target program 50 is resumed.

Second Embodiment

In a target program 50, non-common instructions may be continuous. For example, it is assumed that in the target program 50, a non-common instruction y2 is executed next to a non-common instruction y1. In this case, an invalid instruction handler is called in response to the detection of the non-common instruction y1 in a first processor 10. The invalid instruction handler causes the first processor 10 to execute a common instruction corresponding to the non-common instruction y1. It is assumed that thereafter, processing by the invalid instruction handler is ended and the execution of the target program 50 is resumed. Then, since an instruction to be executed next is the non-common instruction y2, the non-common instruction is detected again in the first processor 10. As a result, the invalid instruction handler is called again.

Here, calling an exception handler involves occurrence of overhead by a context switch or the like. Therefore, the overhead can be reduced by reducing the appearance frequency of the exception handler.

Therefore, an instruction execution control apparatus 3000 of a second embodiment not only causes the first processor 10 to execute a common instruction corresponding to a non-common instruction but also tries to replace the next instruction included next to the non-common instruction in the target program 50 with a common instruction. Specifically, the instruction execution control apparatus 3000 determines whether the next instruction is a non-common instruction. Then, in a case where the next instruction is a non-common instruction, the instruction execution control apparatus 3000 specifies a common instruction corresponding to the next instruction and causes the first processor 10 to execute the specified common instruction.

For example, as described above, it is assumed that the non-common instruction y2 is executed next to the non-common instruction y1 in the target program 50. In this case, in the invalid instruction handler called in response to the detection of the non-common instruction y1 in the first processor 10, 1) processing of causing the first processor 10 to execute the common instruction corresponding to the non-common instruction y1 and also 2) processing of causing the first processor 10 to execute a common instruction corresponding to the non-common instruction y2 that is the next instruction are performed.

More specifically, the invalid instruction handler determines whether the non-common instruction y2 that is the next instruction is a non-common instruction. Since the non-common instruction y2 is a non-common instruction, the invalid instruction handler specifies the common instruction corresponding to the non-common instruction y2 and causes the first processor 10 to execute the specified common instruction. Thereafter, an instruction to be executed in the resumed target program 50 is set to an instruction next to the non-common instruction y2, and then the processing of the invalid instruction handler ends.

Here, it is also conceivable that three or more non-common instructions are continuous in the target program 50. Therefore, the instruction execution control apparatus 3000 may perform similar processing not only with respect to an instruction next to a non-common instruction detected in the first processor 10 but also with respect to the second and third instructions from the non-common instruction. For example, an invalid instruction handler called in response to the detection of a non-common instruction in the first processor 10 sequentially performs processing of causing the first processor 10 to execute a corresponding common instruction for each instruction of the target program 50 following the non-common instruction while the instruction is a non-common instruction.

For example, it is assumed that the target program 50 includes the non-common instruction y1, the non-common instruction y2, a non-common instruction y3, and a common instruction x1 in this order. In this case, an invalid instruction handler is called in response to the detection of the non-common instruction y1 in the first processor 10. The invalid instruction handler causes the first processor 10 to execute the common instruction corresponding to the non-common instruction y1, the common instruction corresponding to the non-common instruction y2, and a common instruction corresponding to the non-common instruction y3. Since an instruction next to the non-common instruction y3 is the common instruction x1, the invalid instruction handler sets an instruction to be executed first in the resumed target program 50 to the common instruction x1. As a result, after the invalid instruction handler ends, the execution of the target program 50 is resumed from the common instruction x1.

Example of Operation and Effects

According to the instruction execution control apparatus 3000 of the present embodiment, in one call of the invalid instruction handler, a common instruction corresponding to a non-common instruction can be executed for each of a plurality of non-common instructions. Therefore, processing of replacing a non-common instruction with a common instruction can be performed with smaller overhead than overhead in a case where there is only one non-common instruction that can be replaced with a common instruction in one call of the invalid instruction handler.

Hereinafter, the instruction execution control apparatus 3000 of the present embodiment will be described in more detail.

Example of Functional Configuration

Figure 8:
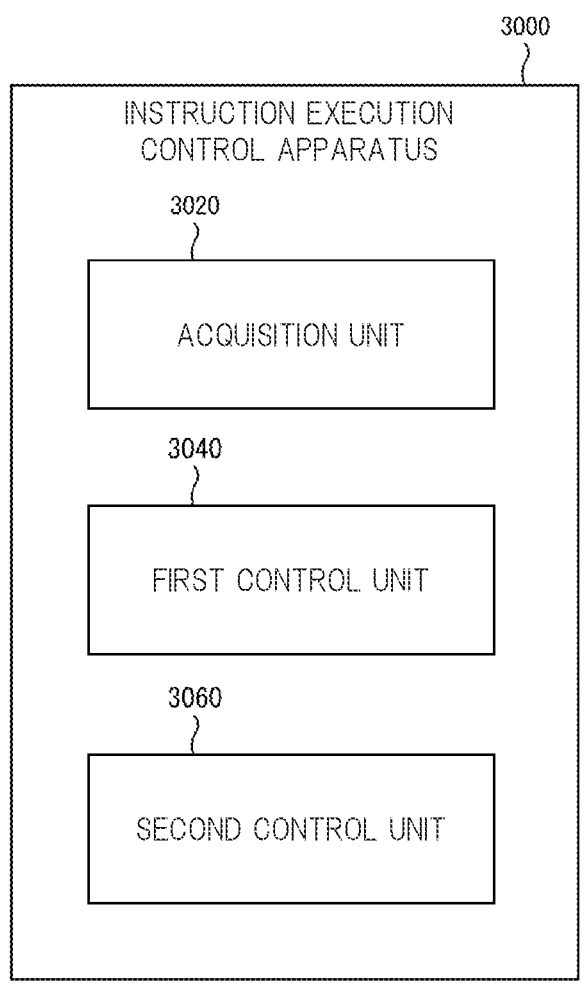
FIG. 8 is a block diagram illustrating a functional configuration of an instruction execution control apparatus according to a second embodiment.

FIG. 8 is a block diagram illustrating a functional configuration of the instruction execution control apparatus 3000 of the second embodiment. The instruction execution control apparatus 3000 of the second embodiment includes an acquisition unit 3020, a first control unit 3040, and a second control unit 3060. The functions of the acquisition unit 3020 and the first control unit 3040 are respectively the same as the functions of the acquisition unit 2020 and the first control unit 2040 included in the instruction execution control apparatus 2000 of the first embodiment. In a case where the non-common instruction is detected in the first processor 10, the second control unit 3060 determines whether the next instruction included next to the non-common instruction in the target program 50 is a non-common instruction. In a case where the next instruction is a non-common instruction, the second control unit 3060 uses correspondence information 60 to specify the common instruction corresponding to the next instruction. Then, the second control unit 3060 causes the first processor 10 to execute the specified common instruction.

Example of Hardware Configuration

The instruction execution control apparatus 3000 of the second embodiment is achieved by, for example, a computer 1000 illustrated in FIG. 4, similarly to the instruction execution control apparatus 2000 of the first embodiment. However, a storage device 1080 of the second embodiment stores a program that achieves each functional component of the instruction execution control apparatus 3000 of the second embodiment.

<Flow of Processing>

Figure 9:
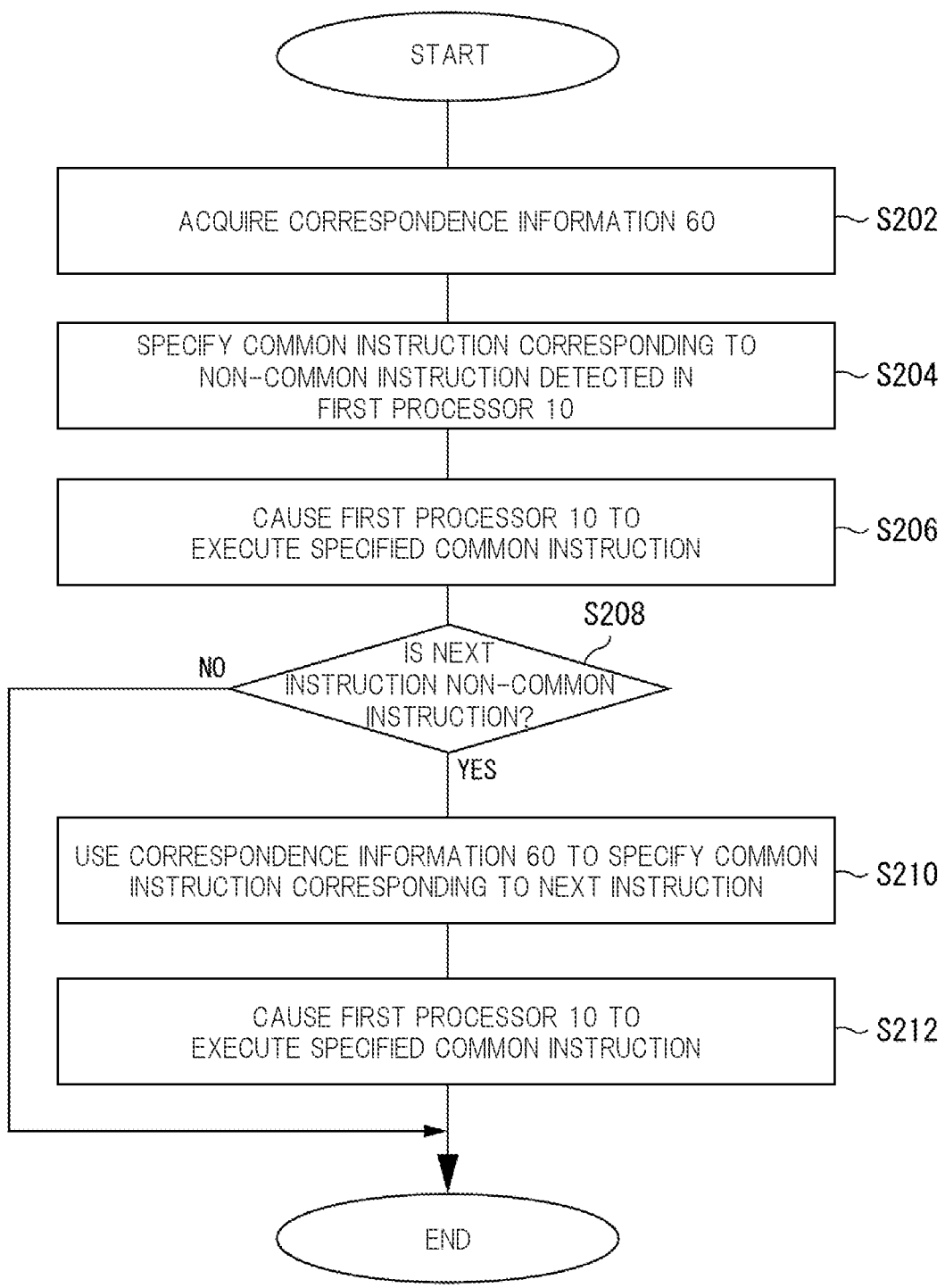
FIG. 9 is a flowchart illustrating a flow of processing executed by the instruction execution control apparatus according to the second embodiment.

FIG. 9 is a flowchart illustrating a flow of processing executed by the instruction execution control apparatus 3000 of the second embodiment. The acquisition unit 3020 acquires the correspondence information 60 (S202). The first control unit 3040 uses the correspondence information 60 to specify the common instruction corresponding to the non-common instruction detected in the first processor 10 (S204). The first control unit 3040 causes the first processor 10 to execute the specified common instruction (S206).

The second control unit 3060 determines whether the next instruction is a non-common instruction (S208). In a case where the next instruction is not a non-common instruction (S208: NO), the processing of FIG. 9 ends.

Meanwhile, in a case where the next instruction is a non-common instruction (S208: YES), the second control unit 3060 specifies a common instruction corresponding to the next instruction (S210). The second control unit 3060 causes the first processor 10 to execute the specified common instruction (S212).

Third Embodiment

<Outline>

An instruction execution control apparatus 4000 of a third embodiment selects one of first processing and second processing as the processing of controlling execution of a target program 50 by a first processor 10. The first processing is the processing described in the first embodiment. In other words, the first processing is processing of causing the first processor 10 to execute a common instruction corresponding to a non-common instruction in response to the detection of the non-common instruction by the first processor 10. In addition, as described in the second embodiment, the first processing may include processing of causing the first processor 10 to execute a common instruction corresponding to the next instruction in a case where the next instruction is a non-common instruction.

Meanwhile, the second processing is processing of performing dynamic binary translation (DBT) with respect to the target program 50. Specifically, regarding an instruction sequence (for example, a basic block) included in the target program 50, the second processing determines whether each instruction sequence included in the instruction sequence is a non-common instruction. Then, the second processing uses correspondence information 60 to replace a non-common instruction with a common instruction. As a result, an instruction sequence including only the common instruction is obtained. Then, in the second processing stores the instruction sequence after the replacement in a storage unit. More specifically, the second processing replaces an original instruction sequence stored in a memory with the instruction sequence after the replacement. As a result, the first processor 10 executes the instruction sequence after the replacement that includes only the common instruction.

As described above, a timing of replacing the non-common instruction with the common instruction is different between the first processing and the second processing. In the first processing, after the first processor 10 is caused to execute the target program 50 that can include a non-common instruction as it is, the non-common instruction is replaced with a common instruction at a timing when the non-common instruction is detected by the first processor 10. Meanwhile, in the second processing, before the first processor 10 is caused to execute an instruction sequence included in the target program 50, a non-common instruction included in the instruction sequence is replaced with a common instruction.

The instruction execution control apparatus 4000 determines which of the first processing and the second processing is to be executed on the basis of the appearance frequency of the non-common instruction in the target program 50. In a case where the appearance frequency of the non-common instruction is less than a threshold value, the instruction execution control apparatus 4000 controls the execution of the target program 50 by the first processor 10 through the first processing. Meanwhile, in a case where the appearance frequency of the non-common instruction is the threshold value or more, the instruction execution control apparatus 4000 controls the execution of the target program 50 by the first processor 10 through the second processing.

Hereinafter, the instruction execution control apparatus 4000 in a state of controlling the execution of the first processor 10 through the first processing is referred to as the "instruction execution control apparatus 4000 in a first mode". Meanwhile, the instruction execution control apparatus 4000 in a state of controlling the execution of the first processor 10 through the second processing is referred to as the "instruction execution control apparatus 4000 in a second mode". These terms can be used to express "the instruction execution control apparatus 4000 operates in the first mode in a case where the appearance frequency of the non-common instruction is less than the threshold value". In addition, it is possible to express that "the instruction execution control apparatus 4000 operates in the second mode in a case where the appearance frequency of the non-common instruction is the threshold value or more".

Example of Operation and Effects

In a case where the instruction execution control apparatus 4000 operates in the first mode, replacement from a non-common instruction to a common instruction is performed in response to the detection of the non-common instruction in the first processor 10. Therefore, the first processor 10 can execute the common instruction originally included in the target program 50 not through control by the instruction execution control apparatus 4000. Meanwhile, since replacement from the non-common instruction to the common instruction is performed in exception processing, overhead due to the exception processing occurs at the time of the replacement.

In response, the instruction execution control apparatus 4000 in the second mode converts the instruction sequence of the target program 50 into an instruction sequence including only the common instruction, and then causes the first processor 10 to execute the instruction sequence. Therefore, since the non-common instruction is not detected by the first processor 10, overhead due to the detection does not occur. Meanwhile, in a case where the instruction execution control apparatus 4000 operates in the second mode, it is also determined whether the common instruction included in the target program 50 is a non-common instruction. Therefore, overhead due to the determination processing occurs.

As described above, in a case where the appearance frequency of the non-common instruction is relatively high in the execution of the target program 50, the overhead can be reduced when the target program 50 is executed using the instruction execution control apparatus 4000 in the second mode as compared with when the target program 50 is executed using the instruction execution control apparatus 4000 in the first mode. Meanwhile, in a case where the appearance frequency of the non-common instruction is relatively low in the execution of the target program 50, the overhead can be reduced when the target program 50 is executed using the instruction execution control apparatus 4000 in the first mode as compared with when the target program 50 is executed using the instruction execution control apparatus 4000 in the second mode.

Therefore, in a case where the appearance frequency of the non-common instruction is less than the threshold value, the instruction execution control apparatus 4000 of the third embodiment operates itself in the first mode. Meanwhile, in a case where the appearance frequency of the non-common instruction is the threshold value or more, the instruction execution control apparatus 4000 of the third embodiment operates itself in the second mode. As a result, the execution of the target program 50 by the first processor 10 can be controlled by a method that results in less overhead according to the appearance frequency of the non-common instruction.

Hereinafter, the instruction execution control apparatus 4000 of the present embodiment will be described in more detail.

Example of Functional Configuration

Figure 10:
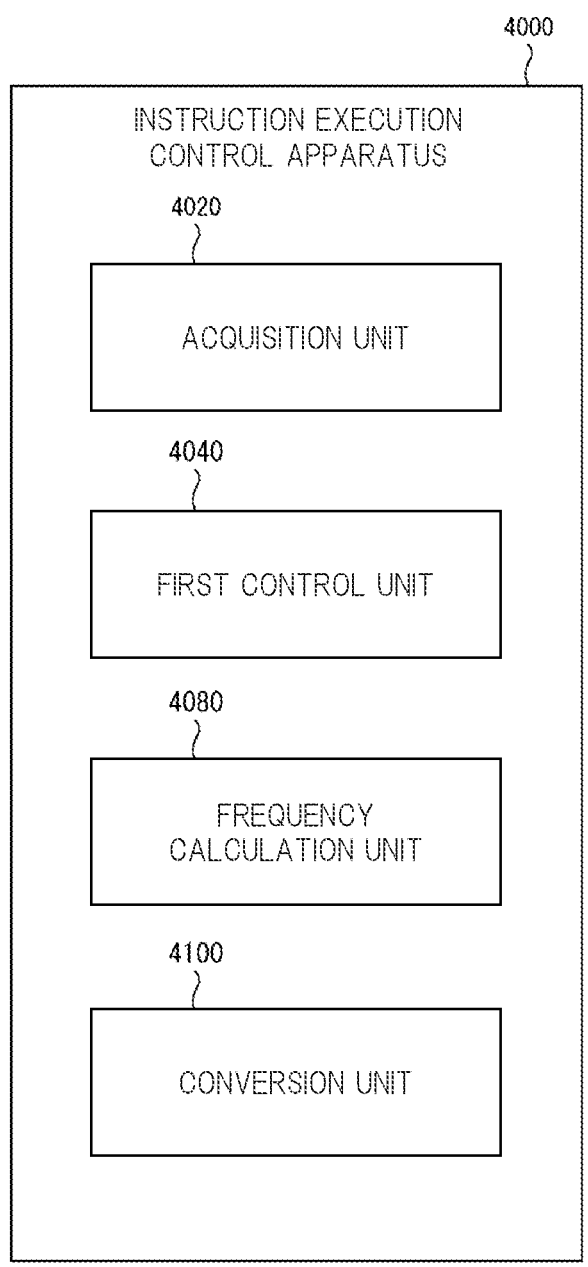
FIG. 10 is a block diagram illustrating a functional configuration of an instruction execution control apparatus according to a third embodiment.

FIG. 10 is a block diagram illustrating a functional configuration of the instruction execution control apparatus 4000 of the third embodiment. The instruction execution control apparatus 4000 of the third embodiment includes an acquisition unit 4020, a first control unit 4040, a frequency calculation unit 4080, and a conversion unit 4100. The function of the acquisition unit 4020 is the same as the function of the acquisition unit 2020 of the first embodiment. The frequency calculation unit 4080 calculates the appearance frequency of the non-common instruction. In a case where the appearance frequency of the non-common instruction is the threshold value or more, the conversion unit 4100 uses the correspondence information 60 to convert the non-common instruction included in the instruction sequence of the target program 50 into the common instruction.

In a case where the appearance frequency of the non-common instruction is less than the threshold value, the first control unit 4040 uses the correspondence information 60 to specify the common instruction corresponding to the non-common instruction detected in the first processor 10 and causes the first processor 10 to execute the common instruction. Except for the other points, the function of the first control unit 4040 is the same as the function of the first control unit 2040 of the first embodiment.

Note that in a case where the instruction execution control apparatus 4000 of the third embodiment has functions similar to functions of the instruction execution control apparatus 3000 of the second embodiment, the instruction execution control apparatus 4000 of the third embodiment further includes a second control unit 4060 (not illustrated). The function of the second control unit 4060 is the same as the function of the second control unit 3060 of the second embodiment.

Example of Hardware Configuration

The instruction execution control apparatus 4000 of the third embodiment is achieved by, for example, a computer 1000 illustrated in FIG. 4, similarly to the instruction execution control apparatus 2000 of the first embodiment. However, a storage device 1080 of the third embodiment stores a program that achieves each functional component of the instruction execution control apparatus 4000 of the third embodiment.

<Flow of Processing>

FIG. 11 is a flowchart illustrating a flow of processing of selecting one of the first processing and the second processing. This processing can also be expressed as "processing of selecting one of a first mode and a second mode as an operation mode of the instruction execution control apparatus 4000".

The frequency calculation unit 4080 calculates the appearance frequency of the non-common instruction (S302). In a case where the appearance frequency of the non-common instruction is less than the threshold value, the instruction execution control apparatus 4000 selects the first processing as processing for controlling the execution of the target program 50 by the first processor 10 (S304). Meanwhile, in a case where the appearance frequency of the non-common instruction is the threshold value or more, the instruction execution control apparatus 4000 selects the second processing as processing for controlling the execution of the target program 50 by the first processor 10 (S306).

Here, a specific method of reflecting a selection result of the first processing and the second processing into the operation of the instruction execution control apparatus 4000 is any method. For example, in an invalid instruction handler, it is determined whether the first processing is selected (in other words, whether the instruction execution control apparatus 4000 is in the first mode). In a case where the first processing is selected, the processing of the first control unit 4040 and the second control unit 4060 is performed in the invalid instruction handler. Meanwhile, in a case where the first processing is not selected, the processing of the first control unit 4040 and the second control unit 4060 is prevented from being performed in the invalid instruction handler.

In addition, in a case where the second processing is selected, a state of the instruction execution control apparatus 4000 is set to a state in which the conversion unit 4100 operates. Here, as a specific method of setting to the state in which the conversion unit 4100 operates, it is possible to use an existing method of setting a state of a system to a state in which dynamic translation is executed.

FIG. 12 is a flowchart illustrating a flow of processing executed by the conversion unit 4100. The conversion unit 4100 acquires an instruction sequence to be converted from the target program 50 (S402). As a specific method of acquiring the instruction sequence to be converted, it is possible to use a method of acquiring a basic block to be subject to dynamic binary translation or the like.

S404 to S410 are loop processing L1 executed for each instruction included in the instruction sequence to be converted. In S404, the conversion unit 4100 determines whether the loop processing L1 has already been executed for all instructions included in the instruction sequence to be converted. In a case where the loop processing L1 has already been executed for all instructions included in the instruction sequence to be converted, the processing of FIG. 12 proceeds to S412.

Meanwhile, in a case where instructions that are not yet set to be subject to the loop processing L1 are included in the instruction sequence to be converted, the conversion unit 4100 selects an instruction positioned at the head among the instructions that are not yet set to be subject to the loop processing L1. The instruction selected here is referred to as the "instruction i".

The conversion unit 4100 determines whether the instruction i is a non-common instruction (S406). In a case where the instruction i is a non-common instruction (S406: YES), the conversion unit 4100 uses the correspondence information 60 to replace the instruction i with a common instruction corresponding to the instruction i (S408). Meanwhile, in a case where the instruction i is not a non-common instruction (S406: NO), instruction replacement is not performed. Since S410 is the end of the loop processing L1, S404 is executed again.

After the execution of the loop processing L1 is completed, the conversion unit 4100 replaces an instruction sequence to be executed by the first processor 10 with an instruction sequence after conversion (S412). As a specific method of the replacement, an existing method adopted in dynamic binary translation can be used.

Here, in the flowchart of FIG. 12, only the non-common instruction among instructions included in the target program 50 is replaced. However, in a case where dynamic translation is performed, there may also be a common instruction that should be replaced among the common instructions. Therefore, the conversion unit 4100 may replace the common instruction among the instruction included in the target program 50 as necessary.

<Calculation of Appearance Frequency of Non-common Instruction: S302>

The frequency calculation unit 4080 calculates the appearance frequency of the non-common instruction in the target program 50 (S302). Specifically, the frequency calculation unit 4080 calculates the appearance frequency of the non-common instruction on the basis of the number of times of detection of the non-common instruction in the first processor 10 in a specific period (hereinafter, the frequency calculation period).

For example, the frequency calculation unit 4080 calculates, as the appearance frequency of the non-common instruction, a value obtained by dividing the number of times of detection of the non-common instruction in the frequency calculation period by a time length of the frequency calculation period. When the time length of the frequency calculation period is t and the number of times of detection of the non-common instruction in the frequency calculation period is c, the appearance frequency of the non-common instruction is c/t.

Note that in a case where the appearance frequency of the non-common instruction is periodically calculated (in other words, in a case where a length of the frequency calculation period is constant), the number of times of detection of the non-common instruction in the frequency calculation period c may be handled as the appearance frequency of the non-common instruction.

In addition, for example, the frequency calculation unit 4080 may calculate, as the appearance frequency of the non-common instruction, a value obtained by dividing the number of times of detection of the non-common instruction in the frequency calculation period by the total number of instructions executed by the first processor 10 in the frequency calculation period. When the total number of instructions executed by the first processor 10 in the frequency calculation period is Na and the number of times of detection of the non-common instruction in the frequency calculation period is c, the appearance frequency of the non-common instructions is c/Na.

Note that the first processor 10 is provided with a counter that counts the number of times instructions have been executed, whereby it is possible to grasp the number of times instructions have been executed by the first processor 10.

In addition, for example, the frequency calculation unit 4080 may calculate, as the appearance frequency of the common instruction, a value obtained by dividing the number of times of detection of the non-common instruction in the frequency calculation period by an amount of increase of a value of the program counter in the first processor 10 in the frequency calculation period. When the amount of increase of the value of the program counter in the frequency calculation period is d and the number of times of detection of the non-common instruction in the frequency calculation period is c, the appearance frequency of the non-common instruction is c/d.

A timing of calculating the appearance frequency of the non-common instruction is any timing. For example, the appearance frequency of the non-common instruction is calculated at a periodic timing. In addition, for example, the appearance frequency of the non-common instruction is calculated in response to the satisfaction of a predetermined condition. The predetermined condition is a condition, for example, such as a condition that "a predetermined user input has been performed".

Here, which of the first processing and the second processing is performed from when the execution of the target program 50 starts until when the appearance frequency of the non-common instruction is calculated first is optional. For example, an administrator of the instruction execution control apparatus 4000 selects one of the first processing and the second processing.

In addition, for example, in a case where the target program 50 is a program executed in the past by the instruction execution control apparatus 4000, one of the first processing and the second processing may be selected on the basis of information at the time of execution of the target program 50 in the past. Specifically, the instruction execution control apparatus 4000 stores, in association with the identification information of the target program 50, both the number of times the first processing was selected (the number of times the appearance frequency of the non-common instruction was less than the threshold value) and the number of times the second processing was selected (the number of times the appearance frequency of the non-common instruction was the threshold value or more) when the instruction execution control apparatus 4000 caused the first processor 10 to execute the target program 50. Then, until the appearance frequency of the non-common instruction is calculated first, the instruction execution control apparatus 4000 uses the first processing or the second processing, whichever was selected a greater number of times at the time of execution in the past.

The invention made by the present inventors has been specifically described on the basis of the embodiments. However, the present invention is not limited to the above embodiments, and it goes without saying that various modifications are possible without departing from the gist of the present invention.

Note that, in examples described above, the target program 50 includes an instruction group (or software code) for causing the computer 1000 to perform one or more functions described in the embodiments in a case where the target program 50 is read by the computer 1000. The target program 50 may be stored in a non-transitory computer readable medium or a tangible storage medium. By way of example and not limitation, the computer readable medium or the tangible storage medium includes a RAM, ROM, flash memory, SSD or other memory technology, CD-ROM, digital versatile disc (DVD), Blu-ray (registered trademark) or other optical disk storages, magnetic cassette, magnetic tape, magnetic disk storage, or other magnetic storage devices. The target program 50 may be transmitted on a transitory computer readable medium or a communication medium. By way of example and not limitation, the transitory computer readable medium or the communication medium include electrical, optical, acoustic, or other forms of propagated signals.

What is claimed is:
1. A non-transitory computer readable storage medium storing a program for causing a computer to:
    acquire correspondence information in which a common instruction executable by both a first processor and a second processor is associated with a non-common instruction that is an instruction not executable by the first processor but executable by the second processor;
    in a case where the non-common instruction is detected in the first processor, specify the common instruction associated with the non-common instruction in the correspondence information and causing the first processor to execute the specified common instruction, and cause the first processor to execute the common instruction associated with the non-common instruction in the correspondence information in an exception handler executed in response to the detection of the non-common instruction in the first processor; and
    determine, in the exception handler, that a next instruction to be executed next to an instruction that has caused the exception handler to be executed is the non-common instruction and causing the first processor to execute the common instruction associated with the next instruction in the correspondence information.

2. The non-transitory computer readable storage medium storing the program according to claim 1 further causing the computer to:
calculate an appearance frequency of the non-common instruction; and
in a case where the appearance frequency of the non-common instruction is a threshold value or more, use the correspondence information to convert, before the first processor is caused to execute an instruction sequence, the instruction sequence into an instruction sequence not including the non-common instruction, wherein the specified common instruction is executed in a case where the appearance frequency of the non-common instruction is less than the threshold value.

3. The non-transitory computer readable storage medium storing the program according to claim 2, wherein, in calculating the appearance frequency of the non-common instruction,
the appearance frequency of the non-common instruction is calculated on the basis of the number of times of detection of the non-common instruction in a period having a predetermined time length,
the appearance frequency of the non-common instruction is calculated on the basis of the total number of instructions executed in the period and the number of times of detection of the non-common instruction in the period, or
the appearance frequency of the non-common instruction is calculated on the basis of an amount of increase of a value of a program counter in the period and the number of times of detection of the non-common instruction in the period.

4. An instruction execution control apparatus comprising:
a circuit configured to:
acquire correspondence information in which a common instruction executable by both a first processor and a second processor is associated with a non-common instruction that is an instruction not executable by the first processor but executable by the second processor;
in a case where the non-common instruction is detected in the first processor, specify the common instruction associated with the non-common instruction in the correspondence information and cause the first processor to execute the specified common instruction, and cause the first processor to execute the common instruction associated with the non-common instruction in the correspondence information in an exception handler executed in response to the detection of the non-common instruction in the first processor; and
determine, in the exception handler, that a next instruction to be executed next to an instruction that has caused the exception handler to be executed is the non-common instruction, and cause the first processor to execute the common instruction associated with the next instruction in the correspondence information in a case where the next instruction is the non-common instruction.

5. The instruction execution control apparatus according to claim 4, wherein the circuit is further configured to:
calculate appearance frequency of the non-common instruction; and
in a case where the appearance frequency of the non-common instruction is a threshold value or more, use the correspondence information to convert, before the first processor is caused to execute an instruction sequence of a program, the instruction sequence into an instruction sequence not including the non-common instruction,
wherein the circuit is configured to operate in a case where the appearance frequency of the non-common instruction is less than the threshold value.

6. The instruction execution control apparatus according to claim 5, wherein the circuit is configured to
calculate the appearance frequency of the non-common instruction on the basis of the number of times of detection of the non-common instruction in a period having a predetermined time length,
calculate the appearance frequency of the non-common instruction on the basis of the total number of instructions executed in the period and the number of times of detection of the non-common instruction in the period, or
calculate the appearance frequency of the non-common instruction on the basis of an amount of increase of a value of a program counter in the period and the number of times of detection of the non-common instruction in the period.

7. An instruction execution control method executed by a computer, the method comprising:
acquiring correspondence information in which a common instruction executable by both a first processor and a second processor is associated with a non-common instruction that is an instruction not executable by the first processor but executable by the second processor;
in a case where the non-common instruction is detected in the first processor, specifying the common instruction associated with the non-common instruction in the correspondence information and causing the first processor to execute the specified common instruction, causing the first processor to execute the common instruction associated with the non-common instruction in the correspondence information in an exception handler executed in response to the detection of the non-common instruction in the first processor; and
determining, in the exception handler, a next instruction to be executed next to an instruction that has caused the exception handler to be executed is the non-common instruction, and causing, in a case where the next instruction is the non-common instruction, the first processor to execute the common instruction associated with the next instruction in the correspondence information.

8. The instruction execution control method according to claim 7 further comprising:
calculating appearance frequency of the non-common instruction; and
in a case where the appearance frequency of the non-common instruction is a threshold value or more, using the correspondence information to convert, before the first processor is caused to execute an instruction sequence of a program, the instruction sequence into an instruction sequence not including the non-common instruction,
wherein the specified common instruction is executed in a case where the appearance frequency of the non-common instruction is less than the threshold value.

9. The instruction execution control method according to claim 8, wherein, in calculating the appearance frequency of the non-common instruction,
the appearance frequency of the non-common instruction is calculated on the basis of the number of times of detection of the non-common instruction in a period having a predetermined time length, the appearance frequency of the non-common instruction is calculation on the basis of the total number of instructions executed in the period and the number of times of detection of the non-common instruction in the period, or the appearance frequency of the non-common instruction is calculated on the basis of an amount of increase of a value of a program counter in the period and the number of times of detection of the non-common instruction in the period.

\* \* \* \* \*